(12) United States Patent
Duna et al.

(10) Patent No.: US 9,034,951 B2
(45) Date of Patent: May 19, 2015

(54) IMITATION WOOD

(75) Inventors: Bernhard Duna, Baldham (DE); Antonio Siu Pak Tak, Singapore (SG)

(73) Assignee: PATENTA ASIA LTD, Tsim Sha Tsui, Kowloon (HK)

( * ) Notice: Subject to any disclaimer, the term of this patent is extended or adjusted under 35 U.S.C. 154(b) by 141 days.

(21) Appl. No.: 13/579,721

(22) PCT Filed: Feb. 19, 2010

(86) PCT No.: PCT/EP2010/001064
§ 371 (c)(1),
(2), (4) Date: Sep. 5, 2012

(87) PCT Pub. No.: WO2011/100995
PCT Pub. Date: Aug. 25, 2011

(65) Prior Publication Data
US 2013/0005868 A1    Jan. 3, 2013

(51) Int. Cl.
C08K 11/00    (2006.01)
C08L 27/06    (2006.01)
C08L 97/02    (2006.01)

(52) U.S. Cl.
CPC    *C08L 27/06* (2013.01); *C08L 97/02* (2013.01)

(58) Field of Classification Search
CPC ................................ C08L 27/06; C08L 97/02
USPC ............................................ 524/15, 425, 788
See application file for complete search history.

(56) References Cited

U.S. PATENT DOCUMENTS 6,011,091 A    1/2000  Zehner
6,758,996 B2 *  7/2004  Monovoukas et al. .... 264/176.1

FOREIGN PATENT DOCUMENTS

| CN | 1432605 A | 7/2003 |
| CN | 1807500 A | 7/2006 |
| CN | 1853958 | 11/2006 |
| CN | 101 074 323 | 11/2007 |
| CN | 101333321 A | 12/2008 |
| JP | 2001-88224 | 4/2001 |
| JP | 2001-89578 | 4/2001 |
| WO | 2010/003403 | 1/2010 |
| WO | 2011/100995 | 8/2011 |

OTHER PUBLICATIONS

Machine translation of JP2001089578, 2001.*
Machine translation of CN1807500, 2006.*
Notification of First Office Action and Search Report issued in Chinese Application No. 201080066283. X, dated Mar. 20, 2014 (English Translation).*
Crespo et al., "Study of the Mechanical and Morphological Properties of Plasticized PVC Composites Containing Rice Husk Fillers", *Journal of Reinforced Plastics and Composites*, 27(3):229-243 (2008).
International Search Report issued in PCT/EP2010/001064 (Sep. 9, 2010), 3 pages.
Invitation to Respond to Written Opinion issued in SG 201206181-8, dated Sep. 9, 2013.
Notification of Reasons for Rejection issued in JP 2012-553186, dated Oct. 1, 2013 (English Translation).

* cited by examiner

*Primary Examiner* — Wenwen Cai
(74) *Attorney, Agent, or Firm* — Nixon & Vanderhye P.C.

(57) ABSTRACT

An imitation wood composition or a composition for making imitation wood, comprising a mixture of 30-40 wt % PVC resin and 30-40 wt % rice-husk and/or peanut-shell powder having a particle size of 0.42-0.25 mm (40-60 mesh). Further disclosed is an imitation wood produced by extruding the imitation wood composition or the composition for making imitation wood. The imitation wood exhibits an appearance and feel very similar to natural wood and can be processed using conventional wood tools. The imitation wood can be painted and adhesively bonded without problems and is suitable for outdoor applications, in particular in humid or wet environments, because of the very high weathering resistance thereof.

6 Claims, No Drawings

IMITATION WOOD

This application is the U.S. national phase of international application PCT/EP2010/001064 filed Feb. 19, 2010, which designates the U.S., the entire content of which is incorporated herein by reference.

The invention relates to the production of a construction material, respectively imitation wood, that is similar to wood in appearance and in feel.

The known plastic-based wood products (what are called "WPCs"=Wood Plastic Composites") are produced from a mixture of wood and PE/PP (polyethylene/polypropylene). These materials are predominantly used without a final surface treatment, for example for the production of floor boards for outdoor areas. The known plastic-based wood products cannot be painted or only with considerable effort. Furthermore, they have the disadvantage that they feel very much like plastic owing to the proportion of PE. For these reasons, the known plastic-based wood products are hardly suited for the production of furniture, and certainly not for the production of solid furniture.

The invention is based on the object to propose a wood-like material that avoids the above-mentioned disadvantages and which, as a matter of principle, primarily avoids the use of wood for reasons of protecting the environment, in particular forests.

The object according to the invention is achieved by a composition for the production of imitation wood.

The invention relates furthermore to imitation wood produced by extrusion of a composition in accordance with the invention.

Moreover the invention provides the uses of imitation wood according to the invention.

Advantageous and/or preferred embodiments of the invention are the subject matter of the dependent claims.

The composition according to the invention for the production of imitation wood contains a mixture of 30 to 40 wt.-% PVC resin (PVC=polyvinyl chloride) and 30 to 40 wt.-% powder of rice-husk and/or peanut-shells having a particle size of 0.42 to 0.25 mm (40 to 60 mesh). The term "mesh" characterises the mesh width of sieves and thus serves as a gauge for indicating the sizes of particles or grains. The smaller the mesh value, the greater the particle size of the bulk material to be described. There are tables, for example from the US Bureau of Standards, for the conversion of mesh values in grid widths to mm.

The PVC material used is not particularly limited. In particular, PVC recycling material can also be used. For example, a PVC resin suspension having a K value of 60 to 70 is suitable. The K value is understood to be a number that is calculated from measurements of the viscosity of diluted solutions of a polymer, and is a gauge for the polymerisation degree or the molecular size. The K value is used for resin specification.

The rice husks or peanut shells used are not subject to any particular restrictions either, in particular not with regard to certain rice or peanut varieties. Rice husks provide better results and are therefore preferred. These can be easily pulverised and optimally mixed with the PVC resin. Moreover, they contain less lignin (only approximately 5%) and therefore fade less under the impact of weather (sun, rain) or not at all.

In one embodiment of the composition for the production of imitation wood according to the invention, the PVC resin and the powder of rice-husk and/or peanut-shell are mixed, for instance, in a ratio of 50:50. The sequence of mixing is generally random.

In a further embodiment of the composition for the production of imitation wood according to the invention, one or more of the following additives is/are added to the mixture of PVC resin and/or rice-husk and/or peanut-shell powder: chemical binder(s) on the basis of thermoplastic (e.g. poly (meth)acrylate), colour pigment(s) (e.g. chalk, titanium dioxide, carbon black, red ferric oxide, ochre), lubricants (e.g. fatty acid salts, such as calcium stearate, fatty acid esters, fatty acid amides, paraffin waxes, polyethylene waxes, microcrystalline paraffin), calcium carbonate and PVC processing aids (e.g. heat and weathering stabilisers, antioxidants, anti-aging agents, light stabilisers, ultraviolet absorbers, antistatic agents). The above-mentioned additives can be obtained from specialised dealers. The additional components can be mixed with the PVC resin and the rice-husk or peanut-shell powder at the same time or in several stages.

A further embodiment of the composition for the production of imitation wood according to the invention contains a mixture of 30 to 40 wt.-%, e.g. 31 to 37 wt.-%, PVC resin, 30 to 40 wt.-%, e.g. 33 to 36 wt.-%, rice-husk and/or peanut-shell powder having a particle size of 0.42 to 0.25 mm (40 to 60 mesh), 8 to 12 wt.-%, e.g. 7 to 9 wt.-%, chemical binder(s) on the basis of a thermoplastic material, 0.5 to 1 wt.-% colour pigment(s), 2 to 4 wt.-% lubricant(s), 12 to 18 wt.-%, e.g. 11 to 15 wt.-%, calcium carbonate and 8 to 12 wt.-% PVC processing aid(s).

The thermoplastic-based chemical binder for example has the function of removing humidity or solvents from natural fibres and binds or crosslinks strongly with the non-woven web or network of natural fibres. PVC processing aids can accelerate the fusion, can improve the melt strength, i.e. the tenacity of the melt, can eliminate surface defects and can reduce the "place out". Moreover, these aids can enhance the metal peel-off properties during the production process. Suitable binders and processing aids are known to the person skilled in the field of PVC processing and are commercially available in great variety.

In a further embodiment of the composition for the production of imitation wood according to the invention, the PVC resin particles and the rice-husk and/or peanut-shell powder have approximately the same grain size.

The imitation wood according to the invention can be produced by extrusion of a composition according to the invention. The product obtained by extrusion has, for example, the shape of a plate or is e.g. a profile.

The extrusion method used is not particularly restricted. Any conventional extruder can be used. Operation of this can follow the manufacturer's instructions. It is clear to a person skilled in the art that the composition according to the invention must be sufficiently homogenised and liquefied under the extrusion conditions (e.g. temperature and pressure), so that the composition can be pressed through the extruder nozzle. Suitable extrusion conditions are either those specified by the manufacturer or are determined by a person skilled in the art by simple routine tests. As is well known, the geometry of the extrusion die used determines the shape or the profile of the extrusion product obtained. The product obtained by extrusion can have, for example, the shape of a plate or be a profile.

For example, the PVC resin is mixed in a high-speed mixer with dried rice-shell powder (particle size 40 to 60 mesh, water content e.g. 0.5 to 1.0%) and, optionally, with a filler (e.g. calcium carbonate) for 5 minutes at 125-140° C. The optional additives, such as colour pigments, stabilisers, processing aids, lubricants (e.g. epoxy soy oil, wax) are blended in a small mixer/blender for 10 minutes and then added to the mixture of PVC resin/rice-husk powder/filler in the high-speed mixer. The entire mixture is then homogeneously mixed for a further 10 minutes. Finally, the mixture is allowed to cool in a cooling tank for approximately 30 minutes and is then extruded using a dual-screw or twin-screw extruder at a controlled temperature in the range of, for example, 150 to 210° C. or 160 to 175° C. to become the imitation wood according to the invention as the final product.

Preferably the plastic skin that forms on the surface of the extrusion product is removed after extrusion. This yields the very wood-like feel and optics of the imitation wood according to the invention. By the removal of the plastic skin, the imitation wood according to the invention also has a good slip resistance. The hue of the imitation wood can be controlled by the colour pigments contained in the composition used for the production thereof. For practical reasons, an intense hue is not used, rather a comparatively paler one. The final hue desired is then achieved by painting/varnishing or glazing the product produced from the imitation wood. By this means, the production and storage of a number of imitation woods with different hues can be dispensed with.

For example, the plastic skin can be removed by abrasion. Abrasion can be carried out, for example, using an abrasion material such as sanding paper or abrasive paper having a grain within the range of 24 to 60, for example by using an electrically operated manual polisher. As regards the grain, a smaller figure denotes a coarser grain and a higher figure stands for a finer grain. A grain of 24 is more likely coarse and is suited, for example, for the removal of layers of glue or paint, while a grain of 60 is a more medium grain and is used, for example, for coarse pre-sanding of raw wood surfaces. The suitable grain is selected by the person skilled in the art depending on the practical circumstances or the effect to be achieved.

As an alternative, the plastic skin can also be removed by different means, for example by planing or by sandblasting.

In a further embodiment of the imitation wood according to the invention, the surface thereof is painted or glazed or oiled, optionally after suitable pre-treatment (e.g. after applying a prime coat). Water-based, single-component paints or varnishes are suitable, for example, for painting. Two-component paints or varnishes are particularly suitable for uses under extreme circumstances.

Depending on the pigmentation and the surface hue, various wood optics and feel can be realised, for example the optics and feel of such exotic woods as Burmese teak, Siamese teak, Java teak or aged teak.

The imitation wood according to the invention can be used as building material, flooring material, wall material, ceiling material, for sleepers, veneers, window casements, fences, furniture, vehicles or casings for electrical devices.

The imitation wood according to the invention, i.e. the substitute material for wood according to the invention, has both the optics and a feel which are very similar to wood, and in many aspects provides substantially improved properties over most types of wood.

Owing to the polar properties of the PVC used, the surface of the imitation wood according to the invention can be oiled, varnished, glazed or painted without any problem, and therefore the new material is particularly suitable for the production of furniture, fences, veneers and even for the stands for sun umbrellas. The polar properties also allow for easy adhesive bonding and provide antistatic properties. Conventional wood/PE composites (WPCs) cannot be painted or can only be painted with great difficulty, cannot be adhesively bonded and are not antistatic owing to the non-polar properties of PE.

Owing to its stability, shape retention and absolute resilience against the influence of humidity such as rain, the material according to the invention is far superior to conventional wood/PE composites (WPCs) and also to many types of wood. Profiles produced from the imitation wood according to the invention are almost completely watertight. The PVC used is not hygroscopic and does not absorb water and thereby prevents the penetration of water through a damaged surface, so that a penetration under the applied paint layers does not take place and the paint does not peel off. The imitation wood according to the invention is therefore dimensionally stable and deformation is not possible by natural means (for example by swelling or shrinkage). In contrast, conventional wood/PE composites swell under the influence of humidity. Paint no longer adheres, since it is undermined by the penetrating water and thus peels off.

The imitation wood according to the invention is therefore particularly suited for furniture to be used in maritime environments, near the ocean or lakes. or in wet areas (for example swimming pools), or as outdoor flooring or for boat decks. Fungal or insect infestation does not occur.

Owing to the excellent strength, hammering nails or screwing screws into the imitation wood according to the invention is possible just as with conventional wood materials. Machine processing is not a problem either, and therefore simple cutting using a saw is possible, as is using a drill, a mill, polishing or sandblasting. The imitation wood according to the invention does not tear and does not splinter, and 100% of any cuttings can be recycled at.

The rice husks and/or peanut shells act as a type of "active filler" and provide the imitation wood according to the invention with improved processing properties for most fields of application. The thermal expansion is smaller, and the consistency and feel of natural wood is achieved, so that the imitation wood according to the invention is superior to conventional "wood plastic composites" or also pure PVC.

Owing to the high content of lignin in the wood used, conventional wood/PE composites tend to gray and yellow due to the influence of sun and rain which decompose the lignin, and they quickly become unattractive as a result. In contrast to this, the imitation wood according to the invention contains very little lignin and therefore does not yellow.

Other properties of the imitation wood according to the invention, such as sound insulation and thermal insulation, are also similar to the characteristic properties of natural wood.

When producing the imitation wood according to the invention, a certain amount of recycled imitation wood according to the invention can also be added to the mixture of PVC resin and peanut-shell and/or rice-husk powder, for example cuttings, which can occur, for example, when such is available for disposal.

The invention claimed is:

1. A composition for producing imitation wood comprising a mixture of:
   30 to 40 wt.-% PVC resin,
   30 to 40 wt.-% rice-husk and/or peanut-shell powder having a particle size of 0.42 to 0.25 mm (40 to 60 mesh),
   7 to 12 wt.-% thermoplastic-based chemical binder,
   0.5 to 1 wt.-% colour pigment(s),
   2 to 4 wt.-% lubricant(s), 11 to 18 wt.-% calcium carbonate and
   8 to 12 wt.-% PVC processing aid(s).

2. The composition of claim 1, containing 31 to 37 wt.-% of the PVC resin.

3. The composition of claim 1, containing 33 to 36 wt.-% of the rice-husk and/or peanut-shell powder.

4. The composition of claim 1, containing 7 to 9 wt.-% of the thermoplastic-based chemical binder.

5. The composition of claim 1, containing 11 to 15 wt.-% of the calcium carbonate.

6. The composition of claim 1, wherein the PVC resin particles and the rice-husk and/or peanut-shell powder have about the same grain size.

\* \* \* \* \*